United States Patent
Adair et al.

(10) Patent No.: US 7,930,051 B2
(45) Date of Patent: *Apr. 19, 2011

(54) MOVE LOT SIZE BALANCING SYSTEM AND METHOD

(75) Inventors: David B. Adair, Huntington Beach, CA (US); James V. Burrell, Denver, CO (US); Charles Chao, Bellflower, CA (US); Mohan K. Gupta, Torrance, CA (US); Melissa Hirota, Long Beach, CA (US); Patrick Jaillet, Lexington, MA (US); Lalit Jain, Cerritos, CA (US); John Kealoha, III, Long Beach, CA (US); Ryan K. Kita, Irvine, CA (US); Quang N. Mai, Huntington Beach, CA (US); Dirk Niemeyer, Foothill Ranch, CA (US); Nirod Samal, Costa Mesa, CA (US); Chung Wang, Hacienda Heights, CA (US); Flora F. Wang, Cerritos, CA (US); Andrea L. Whobrey, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 243 days.

This patent is subject to a terminal disclaimer.

(21) Appl. No.: 12/108,407

(22) Filed: Apr. 23, 2008

(65) Prior Publication Data

US 2008/0319820 A1 Dec. 25, 2008

Related U.S. Application Data

(63) Continuation of application No. 10/036,966, filed on Dec. 20, 2001, now Pat. No. 7,376,477.

(60) Provisional application No. 60/259,398, filed on Dec. 29, 2000.

(51) Int. Cl.
*G06F 19/00* (2006.01)
*G06F 15/02* (2006.01)
*G06F 17/50* (2006.01)
*G06F 9/46* (2006.01)
*G06F 9/44* (2006.01)
*G05B 19/418* (2006.01)
*G06Q 10/00* (2006.01)
*A01K 5/02* (2006.01)

(52) U.S. Cl. .............. 700/100; 700/95; 700/96; 700/97; 700/99; 700/101; 705/7; 705/8; 705/9; 705/28; 705/29

(58) Field of Classification Search .............. 700/95–97, 700/99, 100–101; 705/7–9, 28–29
See application file for complete search history.

(56) References Cited

U.S. PATENT DOCUMENTS
3,624,608 A 11/1971 Altman
(Continued)

*Primary Examiner* — Ronald D Hartman, Jr.
(74) *Attorney, Agent, or Firm* — McDermott Will & Emery LLP (57) ABSTRACT

A method and system for allowing a vehicle dealer and manufacturer to match dealer orders and manufacturing plant shipments easily and equitably are disclosed. The method significantly decreases processing time, saving valuable time, money, and manpower resources. An automated linear expression calculation for determining and balancing vehicle allocation allows for equitable balancing of manufacturing plant orders and efficient optimization. The linear expression calculation may be performed in an iterative series of steps. The linear expression calculation handles a plurality of attribute features, thereby accommodating a plurality of dealer requests and vehicle options. The linear expression calculation creates a matrix representing the plurality of attribute features, and with each iteration the values within the matrix are refined and optimized, with the resulting matrix representing an optimized and balanced allocation of manufacturing plant production orders among a plurality of manufacturing plants.

23 Claims, 4 Drawing Sheets

U.S. PATENT DOCUMENTS

| | | | |
|---|---|---|---|
| 4,931,944 A | 6/1990 | Richter et al. | |
| 4,958,292 A | 9/1990 | Kaneko et al. | |
| 5,136,636 A | 8/1992 | Wegrzynowicz | |
| 5,177,688 A | 1/1993 | Rentschler et al. | |
| 5,278,750 A | 1/1994 | Kaneko et al. | |
| 5,285,392 A | 2/1994 | Kyle et al. | |
| 5,369,570 A | 11/1994 | Parad | |
| 5,550,735 A | 8/1996 | Slade et al. | |
| 5,575,053 A | 11/1996 | Ishida et al. | |
| 5,630,070 A | 5/1997 | Dietrich et al. | |
| 5,742,931 A | 4/1998 | Spiegelhoff et al. | |
| 5,765,143 A | 6/1998 | Sheldon et al. | |
| 5,828,747 A | 10/1998 | Fisher et al. | |
| 5,930,763 A | 7/1999 | Kaneko et al. | |
| 5,963,919 A | 10/1999 | Brinkley et al. | |
| 6,038,309 A | 3/2000 | Ram et al. | |
| 6,049,774 A | 4/2000 | Roy | |
| 6,101,479 A | 8/2000 | Shaw | |
| 6,141,598 A * | 10/2000 | Nam | 700/95 |
| 6,188,989 B1 | 2/2001 | Kennedy | |
| 6,453,209 B1 * | 9/2002 | Hill et al. | 700/95 |
| 6,546,301 B1 | 4/2003 | Walkowiak et al. | |
| 6,546,302 B1 | 4/2003 | Bergeon | |
| 6,609,108 B1 | 8/2003 | Pulliam et al. | |
| 6,711,449 B1 | 3/2004 | Miyahara et al. | |
| 6,711,550 B1 | 3/2004 | Lewis et al. | |
| 6,856,844 B1 * | 2/2005 | McKenzie | 700/96 |
| 6,901,430 B1 * | 5/2005 | Smith | 709/206 |
| 6,980,963 B1 | 12/2005 | Hanzek | |
| 7,117,061 B1 * | 10/2006 | McKenzie | 700/116 |
| 7,577,485 B2 * | 8/2009 | Onizawa et al. | 700/100 |
| 2001/0020230 A1 | 9/2001 | Kaneko et al. | |
| 2002/0052772 A1 * | 5/2002 | Nishimoto et al. | 705/8 |
| 2002/0059089 A1 * | 5/2002 | Suzuki et al. | 705/8 |
| 2003/0046179 A1 * | 3/2003 | Anabtawi et al. | 705/26 |
| 2004/0030614 A1 * | 2/2004 | Shields et al. | 705/26 |
| 2004/0044592 A1 * | 3/2004 | Ubik et al. | 705/28 |
| 2005/0182505 A1 * | 8/2005 | Onizawa et al. | 700/100 |
| 2006/0010017 A1 * | 1/2006 | Hase et al. | 705/7 |
| 2006/0116887 A1 * | 6/2006 | Maekawa et al. | 705/1 |
| 2007/0208580 A1 * | 9/2007 | Schiller et al. | 705/1 |

* cited by examiner

MOVE LOT SIZE BALANCING SYSTEM AND METHOD

CROSS-REFERENCE TO RELATED APPLICATIONS

This Application is a continuation application of U.S. patent application Ser. No. 10/036,966, entitled "Move Lot Size Balancing System and Method," filed Dec. 20, 2001, which claims priority to U.S. Provisional Application No. 60/259,398 filed Dec. 29, 2000, entitled "Move lot size balancing system and method." The contents of both applications are incorporated herein by reference.

BACKGROUND OF THE INVENTION

1. Field of the Invention

This invention relates to vehicle manufacturing and systems for managing its administration and distribution. More particularly, the invention relates to computerized tools for receiving, summarizing, organizing, and balancing vehicle order requests among a plurality of manufacturing plants and re-sellers.

2. General Background and State of the Art

Automobile dealers make a variety of demands for vehicle models, options, and colors. These demands can vary according to time of year, consumer trends, and geographic location. In stocking their lots, automobile dealers are usually limited to the capacities of the manufacturer to produce certain vehicle configurations. Although they can make requests to modify their orders, there is no guarantee that dealers' requests will be fulfilled.

One example of a manufacturing plant's inability to fulfill specific dealer requests on shipment orders comprises limitations or constraints on the production of a certain vehicle model. Such constraints may be the result of a shortage of parts production limitations of the particular manufacturing plant. The constraints on manufacturing plant production in turn limit what can be shipped to dealers.

Due to such limitations, there has been a problem in matching manufacturing plant vehicle productions with consumer and dealer demands and requests. Typical methods for dealing with this problem in the past have involved requiring dealers to construct their requests as a function of manufacturing plant capabilities in lieu of, or in addition to, consumer demand. That is, auto dealers typically receive a suggested order from the manufacturer, or corporate office, which details the contents of the future shipment to the dealer's lot. Once the detailed order arrives at the dealer, it is reviewed by a manager or other employee, who can then make changes to the order. These changes are handled by the manufacturer, but without a guarantee that the changes can actually be accommodated.

This process is very time consuming and inefficient. Moreover, it does not ensure that the problem of matching manufacturing plant output with consumer demand and dealer requests is fully resolved, because there is no mechanism for ensuring that the dealer's annotations will be adhered to or dealt with by the manufacturer. For the dealers, the process is inconvenient and time consuming. Also, because there is no specific or consistent formula for granting these requests to the dealers, the method often produces results that are unfair from the perspective of the dealers. Overall, the result is a time consuming system that has difficulty matching dealers' preferences and demand for vehicles with the manufacturing plant's resources and availability.

Other current methods for matching dealer preferences with manufacturing plant resources and availability include computer assisted calculations for balancing dealer orders among a plurality of manufacturing plants. Ideally, the dealer orders would be consolidated and re-divided into manufacturing plant orders. The manufacturing plant orders would be optimally balanced and distributed among the plurality of manufacturing plants such that, as a minimum requirement toward achieving optimization, each manufacturing plant assigned a manufacturing plant order would be capable of manufacturing and producing the assigned manufacturing plant order. Additional goals commensurate with optimization of manufacturing plant order balancing would include minimizing shipping costs from manufacturing plants to dealers. Unfortunately, current computer assisted methods do not adequately handle dealer requests, and the resulting manufacturing plant order balancing is not optimized.

An example of a dealer request that cannot be handled by current methods for matching dealer preferences with manufacturing plant output involves vehicle emission type. California requires a specific emission type, which is different from the emission types allowed in the other 49 states. Current methods for matching dealer requests to manufacturing plant output do not yield consistent results. As a result, current methods frequently result in manufacturing plant orders including certain emission types to be assigned to the incorrect manufacturing plants, in zones where the emission type is inapplicable or unsupported. In these cases, users of systems operating these methods are required to modify the manufacturing plant orders by hand, which is an inefficient and time-consuming step. Of course, this problem is not limited to vehicle emission type. Rather, it is a widespread problem in the industry, and effects a plurality of vehicle options.

Yet another problem that is common with current systems and methods for matching dealer requests with manufacturing plant production capabilities is the manpower required to administer them. Current methods for balancing a set of dealer orders among a plurality of manufacturing plants involve (1) constructing a combined order model comprising all of the dealer orders (2) dividing the combined order model into component order models and (3) distributing the component order models among multiple system operators during processing. As part of the balancing calculations, the multiple system operators review results of the component order models and modify them by hand. The final result of processing the combined order model is achieved only after each of the component order models is completely processed, including hand-modifications made by each of the multiple system operators. The results of the component order model processing can then be assembled into the final result representing processing of the combined order model. These methods require the multiple system operators to run the system and wait for their component outputs at the same time. Thus, system operators are dependent on each other, and the end result is dependent on all of the system operators. Therefore, these systems and methods are inefficient and require substantial manpower to administer.

Figure 1:
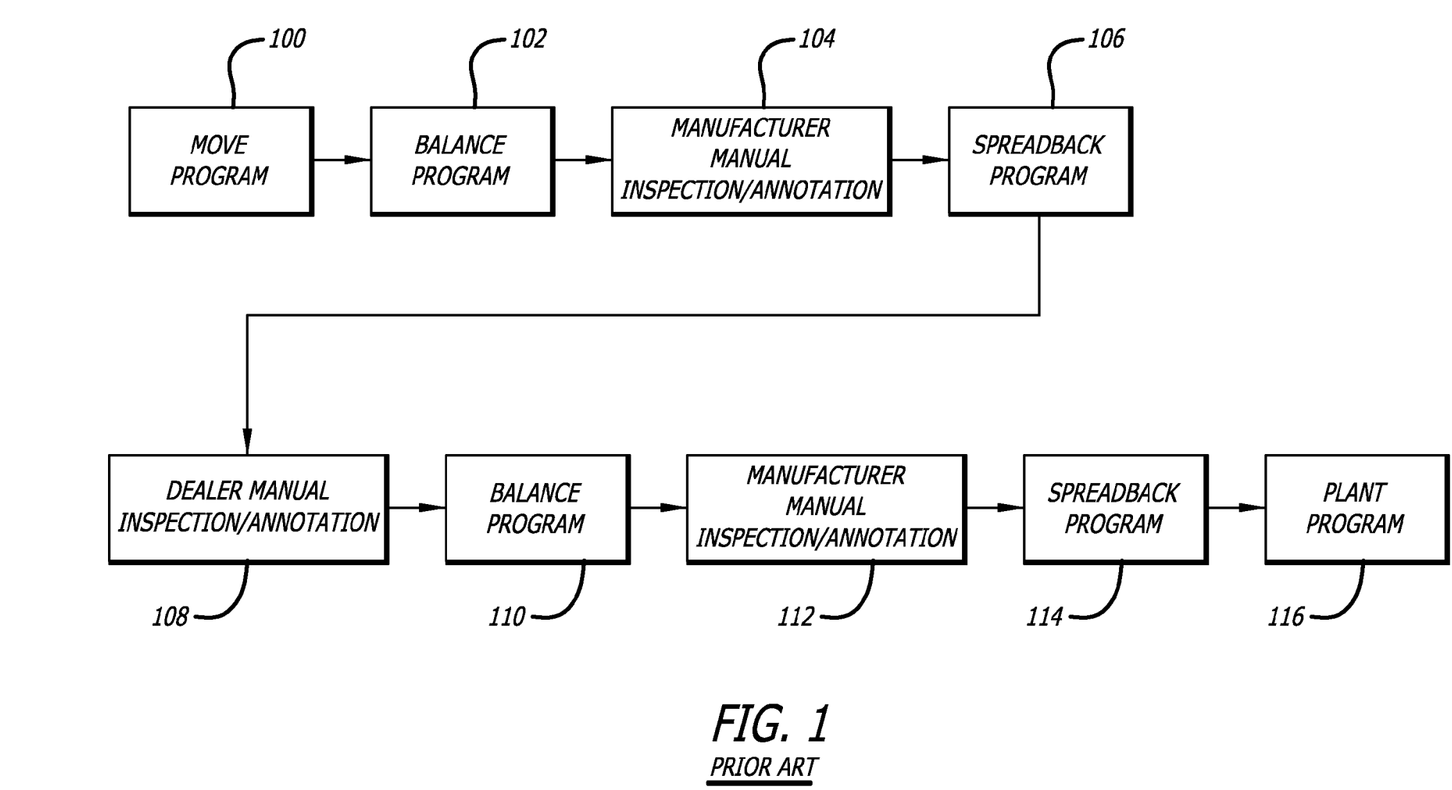
FIG. 1 illustrates a prior art method for matching dealer requests to manufacturing plant production capabilities and for balancing manufacturing plant orders among a plurality of manufacturing plants.

In the prior art method of FIG. 1, for example, the lot size balancing process begins at block 100, where a computer program, the "M.O.V.E." program, is executed to generate a unit table for the allocation that will eventually result from the process. The unit table identifies available manufacturing plants and will, eventually, store data representing manufacturing plant orders that have been transformed from received dealer requests. Each manufacturing plant order is considered a unit within the unit table.

The procedure continues at block 102, where a balance is performed by executing a second computer program, the balance program, to generate a plant production order based on the unit table. Specifically, the plant production schedule is an allocation of received dealer requests or orders among a plurality of manufacturing plants identified in the unit table. The allocation is calculated by the second computer program by forcing the plant production order to conform to lot size rules at each individual manufacturing plant as well as to any production constraints that apply to those manufacturing plants. Lot size rules may include, for example, minimum or maximum limitations on production numbers of vehicles of a certain type. A group of vehicles sharing a common type is considered a lot. Production constraints may result from, for example, manufacturing plant inventory, manufacturing plant production capabilities, and the like.

Next, at block 104, the preliminary production order generated at block 102 undergoes a manual examination. At this point, users such as corporate employees may inspect and modify the preliminary plant production order. Such modifications may be made, for example, for sales or production planning purposes. Following any modifications that occur in this step, a third computer program, a spreadback program, is executed at block 106 to force changes made to the preliminary plant production order to be reflected in the unit table as a revised production order.

The revised production order is sent to automobile dealers at block 108 as a suggested production order. At this step, dealers have an opportunity to review the suggested production order and recommend or request changes to account for demand not reflected in the original allocation but later identified by the dealers. This step may occur multiple times as change requests are received from a plurality of dealers.

The modified production order is then subjected to the balance program a second time, at block 110. Once the production schedule is re-balanced, corporate employees have a second opportunity to inspect the production schedule and make manual changes at block 112. Any changes are forced into the production order via the spreadback program at block 114. Finally, a plant program computer program is executed, at block 116. The plant program assigns a manufacturing plant to each unit in the unit table containing the production schedule.

Clearly, this method results in a number of inefficiencies including a great amount of processing time, several instances of manual user input and, therefore, significant manpower requirements for administering the process. These drawbacks are the result of the general processing algorithm used by this method. Generally speaking, the M.O.V.E. program receives the results of the allocation process as input, and prepares a plant production schedule which closely approximates the results of the allocation while observing lot size rules and constraints that apply at the manufacturing plant that will build the units requested in the allocation. Specifically, the balance program divides the desired quantity of vehicles into groups according to attribute type. Therefore, each member vehicle of a group shares the same attribute type. Each group is then considered by itself, regarding conformity to lot size rules and manufacturing plant constraints. After the balance routine is run for groups according to one attribute type, the allocation is regrouped according to the next attribute type. In this manner, the balancing procedure is applied recursively, by attribute type, each time the balance program is run. Unfortunately, this inefficient method of balancing creates the need for multiple instances of manual user input to re-adjust the balancing results during the process. Moreover, the result is that vehicle manufacturers offer for sale only those vehicles that they have built, which are not necessarily the vehicles that customers want.

INVENTION SUMMARY

The present invention overcomes the problems and disadvantages of the prior art by providing a computerized system and method for matching dealer preferences and demand for vehicles for vehicles with the availability from the manufacturing plant to determine manufacturing plant outputs and subsequent vehicle shipments.

More specifically, the present invention involves a unique method and system which allows the dealer and the manufacturing plant or corporate office to exchange information about possible future vehicle shipments easily and equitably. The present invention allows almost immediate communication, and significantly decreases processing time, saving valuable time, money, and manpower resources. Because the present invention involves the use of an automated linear expression calculation for determining and balancing vehicle allocation, the present method of lot balancing is considered to be more equitable and optimizable than previously known methods.

In one embodiment of the invention, a linear expression calculation is performed in an iterative series of steps. The linear expression calculation handles a plurality of attribute features, thereby accommodating a plurality of dealer requests and vehicle options. The linear expression calculation creates a matrix representing the plurality of attribute features, and with each iteration the values within the matrix are refined and optimized, with the resulting matrix representing an optimized and balanced allocation of manufacturing plant production orders among a plurality of manufacturing plants. The inventive method thereby reduces manpower requirements for administering the system, minimizes shipping costs, maximizes proper matching between dealer requests and manufacturing plant production capabilities, and provides an efficient route for saving valuable time and money. In addition to these important savings over current methods, the present invention results in more equitable balancing of manufacturing plant orders than current methods typically produce.

The foregoing and other objects, features, and advantages of the present invention will be become apparent from a reading of the following detailed description of exemplary embodiments thereof, which illustrate the features and advantages of the invention in conjunction with references to the accompanying drawings.

DETAILED DESCRIPTION OF THE PREFERRED EMBODIMENTS

In the following description of the preferred embodiments reference is made to the accompanying drawings which form a part thereof, and in which are shown by way of illustration specific embodiments in which the invention may be practiced. It is to be understood that other embodiments may be utilized and structural and functional changes may be made without departing from the scope of the present invention.

The present invention involves balancing a combined dealer order, representing vehicle orders from a plurality of dealers, among a plurality of separate manufacturing plants for production and delivery to the dealers. The combined dealer order may specify multiple vehicle types, having multiple vehicle attributes, and require delivery to multiple and geographically separate dealers. The combined dealer order is divided into separate vehicle orders that are ideally matched to individual manufacturing plants. The separate vehicle orders are then assigned to the appropriate individual manufacturing plant, thereby balancing the combined dealer order among the multiple manufacturing plants.

The present invention allows for an efficient and optimizable balancing of the combined dealer order among the multiple manufacturing plants. The allocation of a combined dealer order among a plurality of manufacturing plants is optimized, in that manufacturing plants are assigned particular vehicle orders and are utilized efficiently according to their production capabilities and constraints. The allocation is efficient, in that processing time and effort for calculating the allocation are minimized.

Systems and methods according to the present invention overcome the problems described above, in connection with FIG. 1, because they are designed to handle the multiple attribute types that can be included in any dealer order or in any combination of multiple dealer orders. The ability to handle multiple attribute constraints in dealer orders yields efficient balancing while reducing the need to interject manual user input during processing. Specifically, the present invention utilizes a linear expression capable of handling multiple attribute types and multiple constraints. The inventive linear expression method reduces the need for multiple looping calculations based on manual user input, as performed in prior art methods. However, the capability to perform multiple looping calculations that handle manual user input is maintained as an option for special circumstances, as will be described in more detail below.

Figure 2:
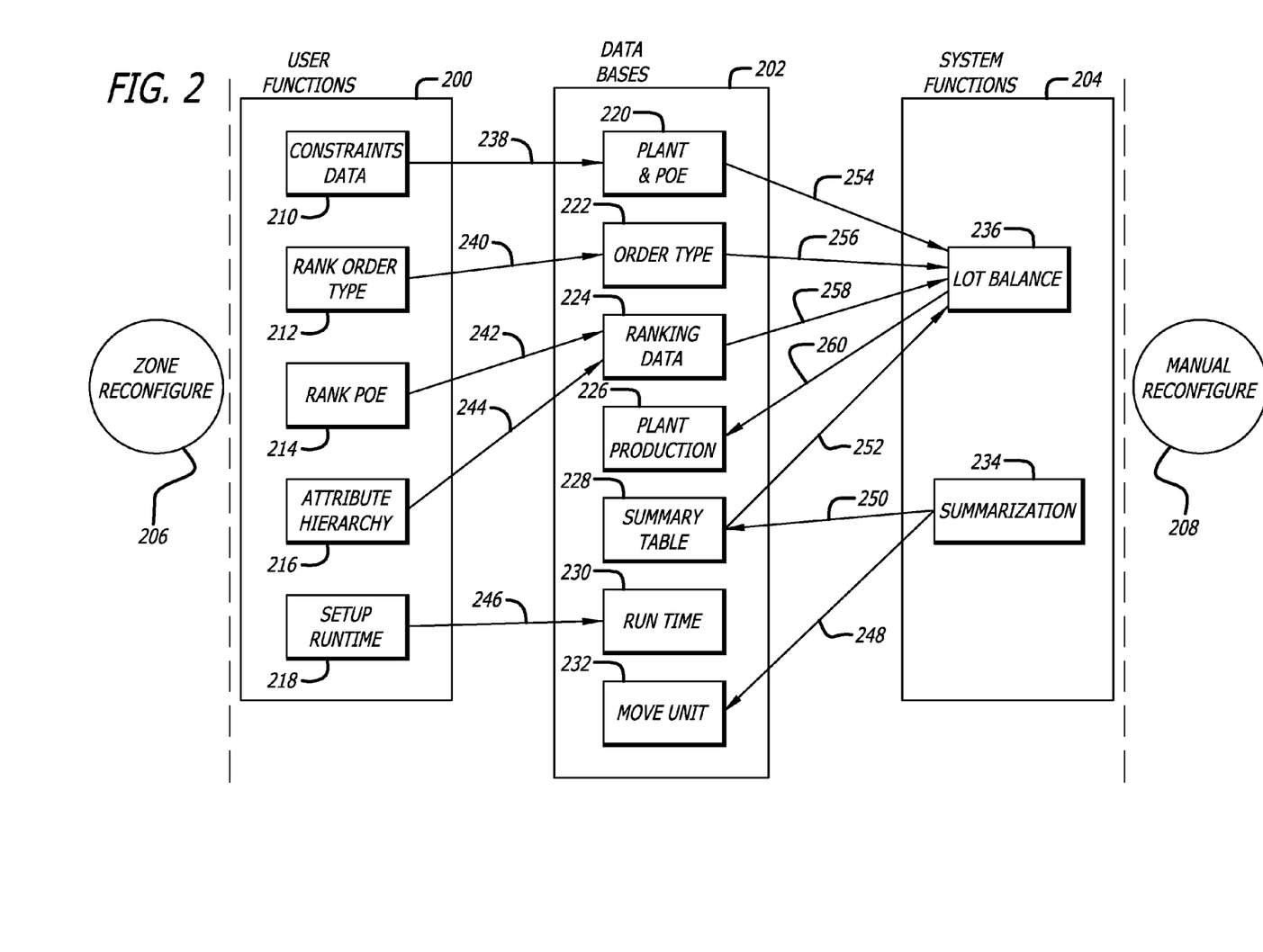
FIG. 2 is a block diagram illustrating various components and functions used by an exemplary method and system of the present invention, and their interactions with each other.

FIG. 2 is a block diagram illustrating various components and functions used by an exemplary method and system of the present invention, and their interactions with each other. The method and system are divided into three segments comprising a set of user functions 200, databases 202 and system functions 204. The user and system functions 200, 204 and databases 202 are utilized and performed between processes of zone reconfiguration of allocations 206 and optional manual reconfiguration of processes 208. More specifically, zone reconfiguration of allocations is performed prior to the method and system of the present invention, and results in input data used by the method and system. And, upon completion of the method and system, an optional manual reconfiguration process is available to alter the results of the method and system in certain situations. The description will now continue with a focus on each of the three segments of the exemplary method and system, and their interdependencies.

User functions 200 comprise a variety of functions performed by a user of the exemplary system prior to execution of the exemplary method. Users are persons who operate systems that utilize methods of the present invention. As part of the system operation, users perform user functions 200 in preparation for lot balancing according to the present invention. Specifically, users enter constraints data 210, rank order type 212, and rank port of entry (POE) 214. Constraints data 210 includes production constraints and capabilities data of manufacturing plants. Rank order type data 212 involves reviewing order type definitions, which are established according to vehicle type or emission type combinations, for example, and ranking them as to importance. The more important an order type is ranked, the higher priority it receives in future balancing calculations and processes. Finally, rank port of entry (POE) 214 involves ranking entry points according to the manufacturer's preferences. Such preferences may be dependent upon, for example, geographical location and shipping logistics and cost considerations. In summary, these three sets of user-defined information remain constant with time and throughout a plurality of allocation calculations. Typically, they are only altered or added to by users upon the addition of a new manufacturing plant or when a new model or a new order type is introduced.

Other user functions include attribute hierarchy 216 and setup runtime 218. These functions are entered by the user prior to each allocation calculation. Vehicle attributes are assigned within a hierarchy according to the needs of the particular allocation that is to be calculated. For example, certain vehicle features or attributes may be more important in some allocations and less important in others. The importance of each attribute for any given allocation calculation, then, is established by defining the attribute hierarchy 216 prior to the allocation calculation. Also prior to the allocation calculation, the user defines a preferred runtime and runtime parameters by entering them at setup runtime 218. Runtime parameters may include, for example, steps in the processing that are to be skipped in order to save time, or extra steps in the processing that are to be added in order to increase accuracy and optimization of the final result. Such steps, that are elected at setup runtime 218 as runtime parameters, are considered extra steps and may involve, for example, post-processing adjustment and fine tuning.

Each of the five previously described user functions 200 may be performed through a graphical user interface (GUI) wherein appropriate forms are presented to the user for entering the required information. Of course, other computerized methods are also feasible and considered to be within the scope of the present invention.

Databases 202 include a plurality of modifiable tables containing information such as global ranking of information and other allocation-specific information such as production constraints and attribute hierarchy. Some tables are used as input to methods and systems of the present invention, while some tables represent the post-processing output data. Specifically, Plant and POE table 220 contains data descriptive of manufacturing plant and POE constraints. These data include, for example, manufacturing plant production capability constraints and POE preferences. Order type table 222 contains data descriptive of order type ranking, i.e., identification and weighting information for various order types. Ranking data table 224 includes data representing both POE rankings and attribute hierarchy. Plant production table 226 contains output data generated by the lot balancing feature of methods and systems of the present invention. Summary table 228 comprises data representing summaries of dealer orders and suggested allocations. These data are used as input to the lot balancing feature of methods and systems of the present invention. Run time table 230 includes data for controlling runtime parameters of the methods and systems of the present invention. Finally, Move Unit table 232 comprises data representing unit tables utilized in methods and systems of the present invention. As will be described in further detail below, unit tables represent a specific organized format for allocations.

System functions 204 form the lot size balancing portion of the exemplary method and system. A summarization 234 is run, such as by an executable computer program, for each allocation. The summarization process 234 summarizes unit information at the zone and order type level. Summary files, generated by summarization process 234 and stored in summary table 228, are then used as input for lot balance process 236. Lot balance process 236 is run for each allocation, and can also be run for groups of simultaneous allocation groups. Upon completion of each allocation group lot balancing, the entire lot balance is also considered complete.

As illustrated by arrows 238, 240, 242, 244, 246, 248, 250, 252, 254, 256, 258, and 260 in FIG. 2, user functions 200, databases 202 and system functions 204 are interdependent. User input of constraints data 210, rank order type 212 and rank POE 214 cause updates to databases plant and POE table 220, order type table 222 and ranking data table 224, respectively, as indicated by arrows 238, 240 and 242, respectively. Ranking data table 224 is also modifiable by user input of attribute hierarchy 216 as indicated by arrow 244. Finally, user input of setup runtime 218 updates database run time table 230, indicated by arrow 246. In addition to user functions 200, system functions 204 also affect databases 202. Specifically, summarization function 234 yields output stored in move unit table 232 and summary table 228, indicated by arrows 248 and 250, respectively. Summary table 228 is then used to create an input file received by lot balance program 236, indicated by arrow 252. Other inputs to lot balance program 236 include files derived from or constructed according to plant and POE table 220 indicated by arrow 254, order type table 222 indicated by arrow 256, and ranking data 224 indicated by arrow 258. After lot balance program 236 is executed, its output generates data for plant production table 226, indicated by arrow 260. This reporting of the lot balance process, although considered complete, may serve as input to a manual reconfiguration process 208 if necessary.

Figure 3:
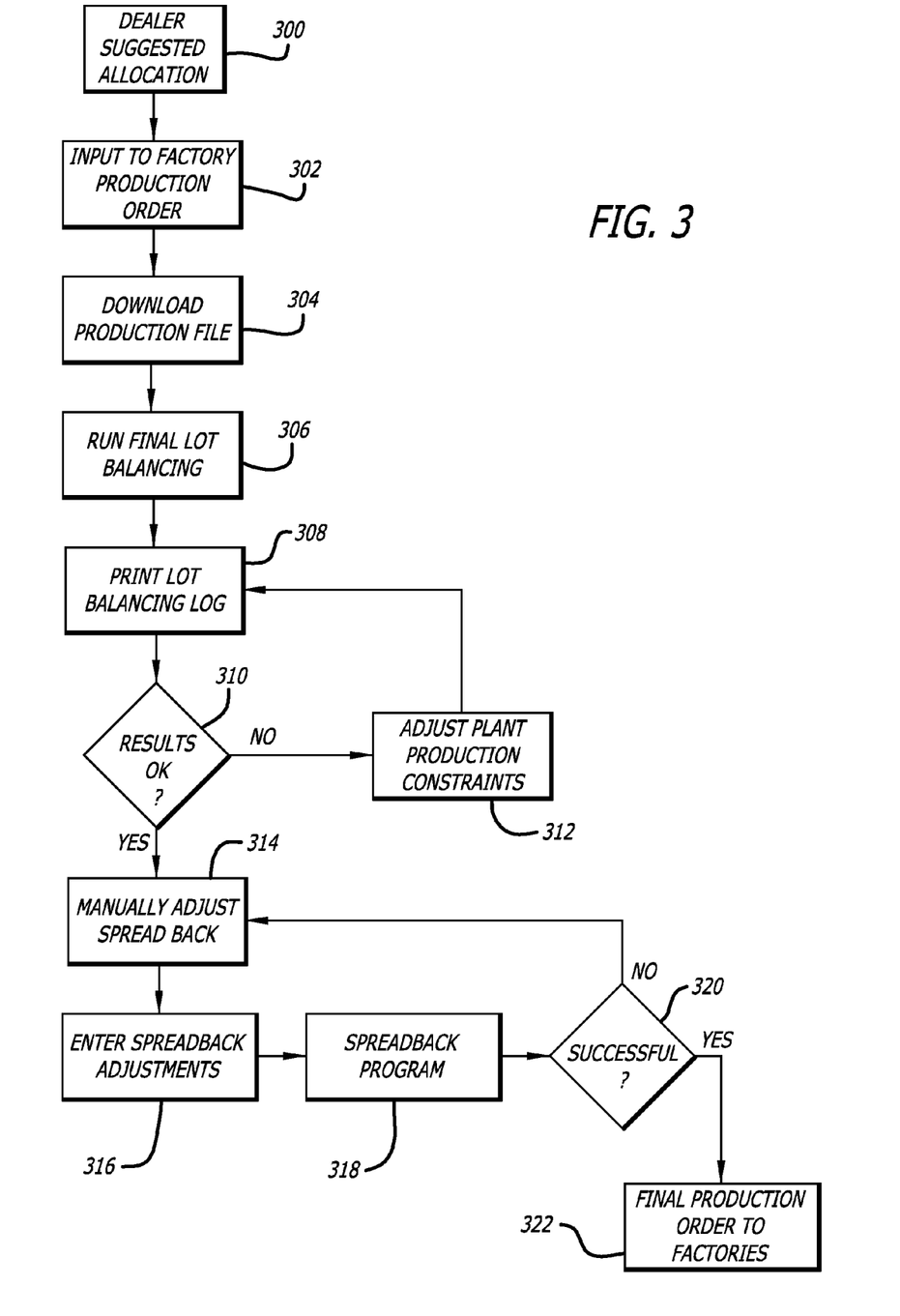
FIG. 3 is a flow diagram detailing functions of an exemplary method according to the present invention.

The interdependencies of the various method and system components described above are now described in more detail. FIG. 3 illustrates a block diagram of certain functions of an exemplary method according to the present invention. The exemplary method begins at block 300 with a dealer suggested allocation. The allocation comprises one or more units, each unit representing a set of vehicles that is to be manufactured at one or more manufacturing plants. The units may be grouped according to a number of different methods such as, for example, according to attribute type or emission type. That is, each vehicle within a particular unit of the allocation shares a common attribute type or a common emission type. Together, the one or more units establish an allocation.

The dealer suggested allocation is based upon dealer orders and requests and, therefore, represents a more accurate allocation than the manufacturer suggested allocation utilized in the prior art method. By beginning with the more accurate dealer suggested allocation, the present invention allows for more accurate results and reduces the need for iterative calculations and manual user input or dealer modifications.

The dealer suggested allocation assembled at block 300 is received, in the exemplary method, as input to a manufacturing plant production order at block 302. At this step, multiple dealer suggested allocations may be received. These allocations may include, for example, vehicle orders directly from dealers or allocations suggested by zones. A zone, as utilized by the present invention, is a defined geographical area encompassing one or more dealers. Typically, a zone definition is established according to regulations or restrictions on vehicles according to geographic region. For example, vehicle emissions are regulated differently in different states. Therefore, zones are defined according to vehicle emission regulations, wherein each zone represents a specific emission type. Returning to block 302, in the case in which allocations are suggested by zones, these allocations are composite allocations including data from one or more dealer suggested allocations. Composite allocations are considered a manufacturing plant production order, representing vehicle orders from a plurality of dealers.

Upon receipt of the dealer suggested allocations and zone allocations by a system utilizing the exemplary method, a production file is downloaded at block 304. The production file comprises data received and calculated according to the previously described steps, and is specifically formulated to serve as input to the lot balancing feature of the exemplary method. A lot balancing program is executed at block 306. Before moving beyond the lot balancing feature, however, a more detailed description of lot balancing now is provided with reference to FIG. 4.

Figure 4:
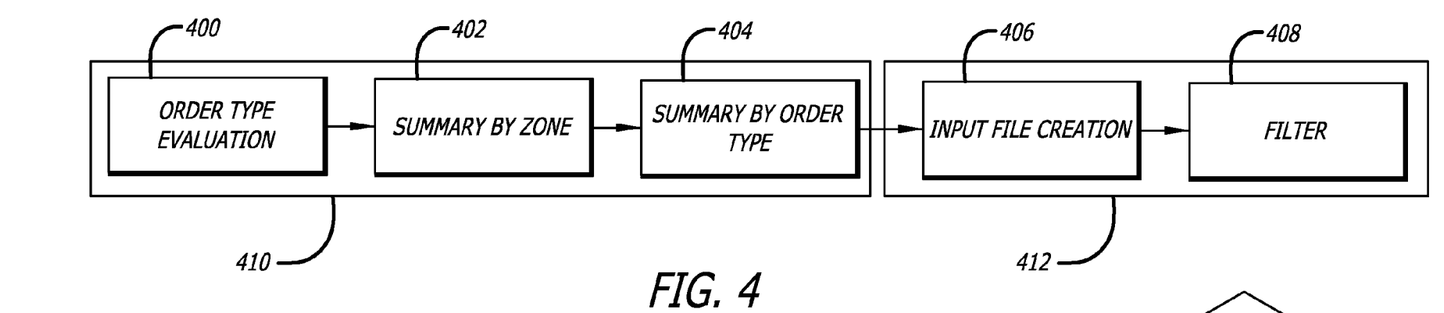
FIG. 4 is a flow diagram detailing functions of one component of the method illustrated in FIG. 3.

FIG. 4 illustrates more detailed functions involved in the step of lot balancing at block 306 of FIG. 3. The lot balancing process comprises two separate computer routines: a lot summary program 410 and a lot balance program 412. Lot summary program 410 comprises order type evaluation 400, summary by zone 402 and summary by order type. Lot balance program 412 comprises input file creation 406 and filter 408. These component functions of lot summary program 410 and lot balance program 412 are now described in further detail.

Beginning with the first component function of lot summary program 410, the allocations that were received at block 302 of FIG. 3 and included in the production file downloaded at block 304 are evaluated by order type, at block 400. Specifically, a computer program evaluates each unit in the allocation. An exemplary evaluation computer program evaluates the allocation for its category, purpose, reason and unit disposition code. These are each features of the units within the allocation. However, the list of features is not exclusive nor exhaustive, and a manufacturer will establish its own list of features according to which the units of the allocation is evaluated. After the evaluation, the exemplary evaluation program builds a unit table with a mapping process. Referencing a pre-determined order type table, the results of the allocation evaluation are referenced to the order type table, from which an order type is then mapped to each unit within the allocation. The result is an updated unit table 232 (FIG. 2) comprising a listing of units within the allocation and their corresponding order types determined according to the evaluation. Unit table 232 is then ready for the first step in the summarization process.

The next two steps, at blocks 402 and 404, result in creation of a spreadback table. Later in the process, depending upon run time parameters 230 (FIG. 2) established by the setup runtime function 218 (FIG. 2), either this spreadback table or unit table 232, as updated at block 400, will be utilized by the lot balance program. The two summarization functions, at blocks 402 and 404 are now described in more detail.

At block 402, unit table 232 is summarized by variant and zone. As used herein, the term variant refers to a unique code description of a vehicle specification. Each unique variant describes a particular set of vehicle specifications such as, for example, a vehicle's model identification, emission type, trim, transmission, and exterior/interior color. Each possible combination of those features is described by a different, and unique, variant. The variants included within a combined dealer order, in combination with production constraints and capabilities of manufacturing plants, define attribute constraints. Attribute constraints are calculated for each combined dealer order according to the variant and the manufacturing plant production capabilities or limitations. The calculated attribute constraints are constraints imposed on manufacturing plants by the variants identified within the combined dealer order. Of course, an attribute constraint can also be calculated according to the specified vehicle options, e.g., before the specified vehicle options have been "translated" into variants.

A summarization program, at block 402, summarizes data from unit table 232 created at block 400 and according to variant and zone. The summarization data is loaded into a spreadback table, used as potential input to the lot balance program, depending on runtime parameters. The summarization program selects all active data from each unit within the suggested allocation having variants and variant identifications. Utilizing the variant identifications and a mapping procedure, dealers represented by each unit are identified. Then, following a similar mapping procedure, the identified dealers are used to determine the zones associated with each unit. The sum of the number of units required for each zone and the number of units required for each variant identification is inserted into the spreadback table. It will be readily apparent to those skilled in the art that an efficient means for performing such mapping procedures in the context of a summarization program will utilize pointer arithmetic.

At block 404, the summarization program summarizes data from unit table 232 based on variant, zone, and order type. Specifically, the summarization program selects all active data from a unit associated with an allocation identification and having variants and variant identification. A mapping routine is then performed to identify dealers associated with each of the selected units. Using the identified dealers in another mapping procedure, the associated zones are determined for each identified unit. The number of units required for each zone and variant identification combination is then summed, and inserted into the spreadback table. The results of the summarization performed at block 402 and loaded into the spreadback table are then available as possible input to the lot balance program, depending on the runtime parameters. Again, it will be readily apparent to those skilled in the art that an efficient means for performing such mapping procedures in the context of a summarization program will utilize pointer arithmetic.

After summarization, the lot balance program 412 is executed. First, an input file creation program is executed at block 406. The file creation program produces a formatted computer file containing data from summary table 228. The computer file is formatted such that it may be used as direct input to the lot balance program. The specific format of the file is dependent upon the architecture of the lot balance program, and those skilled in the art will recognize how the file should be constructed to be received and processed in the lot balance program according to its architecture. Contents of the input file may vary depending upon runtime parameters. For example, because runtime parameters determine whether to modified unit table 232 or spreadback table are used by the lot balance program, the input file will include different instructions regarding which table to use depending on what the runtime parameters are. A separate input file is created for each allocation group.

Finally, at block 408, a filter program creates a matrix of constraint information for the input file. The matrix also serves as input to the lot balance program. The lot balancing program employs linear expressions to balance the summarized order according to its multiple attribute constraints. For example, certain variants contained within a combined dealer order in combination with manufacturing plant production capabilities and constraints define attribute constraints imposed on the manufacturing plants. The attribute constraints are applied by linear expressions, yielding efficient balancing of the combined dealer order among multiple manufacturing plants in accordance with the defined attribute constraints. By using linear expressions involving manufacturing plant production capabilities and tolerances, a calculation can be performed on the manufacturing plant production order and the attribute constraints, the calculation dividing the manufacturing plant production order into balanced assignments according to the multiple attribute constraints. Specifically, a calculation is performed on the manufacturing plant production order and the attribute constraints by identifying attribute constraints with associated variant types and using a linear expression for each variant type, the linear expression involving manufacturing plant production capabilities and constraints.

For example, the lot balancing program utilizes a linear expression to ensure a minimum relative difference between variants that are requested within a combined dealer order and variants that are imposed upon a manufacturing plant when vehicle orders are allocated among multiple manufacturing plants. Therefore, if a manufacturing plant is capable of producing "x" number of "variant A" vehicles, the lot balancing program will use a linear expression to ensure that it does not allocate more or less than a minimum relative difference from "x" of "variant A" vehicles to that manufacturing plant. For example, if the minimum relative difference is defined as "y" percent, an exemplary linear expression used by the lot balancing program is:

$$\text{Floor}=x*(1-(y/100)) \leq Z \leq \text{Ceiling}=(x*(1+y/100))$$

where "Z" is the number of "Variant A" vehicles to be allocated to the manufacturing plant. The left side of the equation represents the floor, or the lowest number of "Variant A" vehicles that will be allocated to the manufacturing plant. The right side of the equation represents the ceiling, or the highest number of "variant A" vehicles that will be allocated to the manufacturing plant.

Alternatively, an absolute tolerance may be specified instead of a percentage tolerance. Linear expressions using an absolute tolerance are more suitable for vehicle orders comprising small numbers of vehicles, where a percentage tolerance may not provide enough variance between the floor and the ceiling, thus rendering the result too inflexible for optimized balancing. An absolute tolerance is an absolute number of vehicles "y" used as the manufacturing plant tolerance. An exemplary linear expression utilizing the absolute tolerance "y" to calculate the number "Z" of vehicles of a particular variant type assigned to a manufacturing plant capable of producing "x" vehicles of the particular variant type is:

$$\text{Floor}=x-y \leq Z \leq \text{Ceiling}=x+y$$

where the left side of the equation represents the floor, or the lowest number of particular variant type vehicles that will be allocated to the manufacturing plant and the right side of the equation represents the ceiling or the highest number of the particular variant type vehicles that will be allocated to the manufacturing plant.

As will be recognized by those skilled in the art, if optimization considerations establish that no vehicles of a certain variant type should be assigned to a particular manufacturing plant, the two exemplary linear expressions above may prevent that result. This is because the floor in both equations may not equal zero. Therefore, methods and systems of the present invention may use linear expressions that apply an additional rule in the lot balancing program. For all variant types whose total requests (in the combined dealer order) across all zones is less than or equal to the value of a lot size (defined as the number of vehicles in an allocation assigned to a manufacturing plant), then the lower bounds in the constraints associated with the request for such variants are all relaxed to be zero. This makes available the option of not building any of that variant type vehicle, should other optimization considerations call for such a result. For example, if a lot size is 30 vehicles, and "zone 1" dealers request 9 "Variant A" vehicles, "zone 2" dealers request 10 "Variant A" vehicles, and no other zones request "Variant A" vehicles, then the total number of requested "Variant A" vehicles (19) is less than the lot size (30). In that case, the "floor" in the linear expressions utilized by the lot balancing program would automatically be relaxed to zero, such that the lot balancing program would be allowed to allocate zero "Variant" A vehicles to any manufacturing plants, should other optimization considerations call for it. Exemplary equations having the relaxed floor and using a 10% threshold and an absolute tolerance of 2 vehicles are as follows:

$$\text{Floor}=0 \leq X_1 \leq \text{Ceiling}=(9*(1.1)); \text{ AND}$$
$$\text{Floor}=0 \leq X_1 \leq \text{Ceiling}=(9+2)$$

$$\text{Floor}=0 \leq X_2 \leq \text{Ceiling}=(10*(1.1)); \text{ AND}$$
$$\text{Floor}=0 \leq X_1 \leq \text{Ceiling}=(10+2)$$

where $X_1$ is the number of "Variant A" vehicles allocated to zone 1 and $X_2$ is the number of "Variant A" vehicles allocated to zone 2.

Again, the steps of FIG. 4, including the linear expressions described above, are involved in the lot balancing execution, shown at block 306 of FIG. 3. After the lot summary program and lot balance program are executed, completing the lot balancing function, the results of the method and system of the present invention are optionally subjected to manual reconfiguration as shown at element 208 in FIG. 2. The optional manual reconfiguration is also shown, in more detail, in FIG. 3 as described below.

After lot balancing 306, results are printed in a lot balancing log at block 308. Although the invention significantly increases efficiency and reduces processing time and costs, in some situations an iterative calculation may be desired. For example, some of user functions 200, which are performed prior to lot balancing, may be performed incorrectly. In such a case, the mistakes may be manually reconfigured and the lot balancing re-run as a new iteration. Another use for manual reconfiguration is a more efficient use of spreadback. That is, methods of the present invention allow for spreadback functions to be applied on an order level, after completion of lot size balancing. If users elect to apply spreadback after lot size balancing, on an order level, they avoid the time consuming iterative process of modifying constraints and re-running lot size balancing. Only when modifying constraints is necessary, such as the scenario in which a user makes a data entry error described above, does the present invention utilize manual reconfiguration for modifying constraints and running lot size balancing in an iterative fashion. More specifically, two scenarios call for manual reconfiguration: user error and election to apply spreadback on an order level. It is to be understood, however, that the methods and systems of the present invention can be accurately utilized without any manual reconfiguration, and that the manual reconfiguration options are maintained for these limited scenarios only. The manual reconfiguration processes for these two scenarios is now described in further detail.

Methods of the present invention enable users to compensate for user error executed early in the processing stages without requiring the user to return to the early processing stages and abandon all subsequent progress. That is, user errors can be corrected in an iterative fashion late in the processing stages, although the user errors were actually made early in the processing stages. After the final lot balancing is run at block 306, and the results are printed in a lot balancing log at block 308, the printed results are reviewed by a user. The user determines whether the results are satisfactory at block 310. The determination may be made according to a comparison of the results with expected or anticipated results, or it made be made in view of an obvious in on of the user functions 200 (FIG. 2) that have flawed the results. If the user determines, at block 310, that the results are not satisfactory, manufacturing plant productions constraints are altered, at block 312. To perform the alteration, the user accesses constraints data function 210 (FIG. 2). After the alteration, a new lot balancing log is printed at block 308. The process is repeated until the user determines at block 310 that the results are satisfactory.

After results are determined to be satisfactory at block 310, a user may manually adjust spreadback at block 314. Like adjustment of manufacturing plant production constraints, spreadback is a means for fine tune adjustment of a final order. Spreadback, however, is done on an order level. That is, it is performed on individual manufacturing plant orders. In contrast, adjustment of manufacturing plant production constraints is performed at a higher level and prior to lot balancing. While wide-sweeping changes can be made by adjusting production constraints and re-running lot balancing, spreadback allows for smaller-scale changes without requiring lot balancing to be re-executed. In the event that a user determines spreadback adjustment is desired on a particular order, the user manually enters the desired adjustments in a computer program at block 316. After the desired adjustments are entered, the spreadback program is executed at block 318. Then, at block 320, the user examines the results of the spreadback and determines whether the desired effect was achieved by running the spreadback. If not, the process repeats until the determination at block 320 yields an affirmative result. After this fine tuning, the final production order is sent to the manufacturing plants at block 322.

Figure 5:
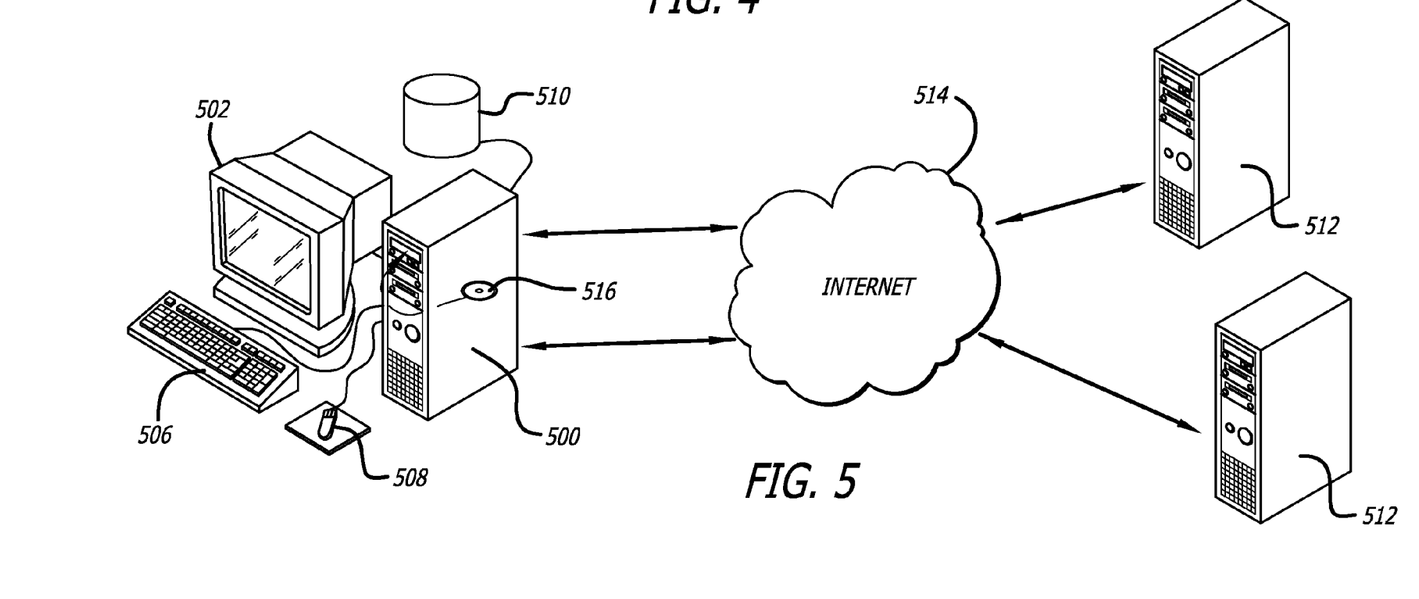
FIG. 5 illustrates an exemplary system of the present invention.

FIG. 5 illustrates an system utilized to implement a method of the present invention. A computer 500 is used to execute various computer software programs utilized by methods of the present invention. A user views the programs on a computer monitor 502. The programs may appear on monitor 502, for example, as graphical user interfaces that the user can interact with. Input by the user is accomplished with a computer keyboard 504, mouse 506, or other peripheral input device. Data used in methods of the present invention may be stored remotely in a database 510 or locally on computer 500. Data is received from dealer computers 512 over the Internet 514 or other communications network. The computer programs utilized by methods of the present invention can be stored on computer readable media, such as a CD-ROM 516, and installed on computer 500. Of course, it is contemplated to be within the scope of the present invention that a variety of system configurations may be utilized to execute and support methods of the present invention.

The foregoing description of the preferred embodiments of the invention has been presented for the purposes of illustration and description. It is not intended to be exhaustive or to limit the invention to the precise form disclosed. Many modifications and variations are possible in light of the above teaching. For example, the lot balancing method of the present invention may comprise a single calculation without implementing adjustment of manufacturing plant constraints or spreadback fine tuning methods. Among other possibilities, the invention may be utilized to optimize a variety of products manufacturing schemes, and is not limited to the production of vehicles. It is intended that the scope of the invention be limited not by this detailed description, but rather by the claims appended hereto.

What is claimed is:

1. A method for calculating and sending balanced assignments based on dealer orders that are optimized for manufacturing plant output, comprising:
   receiving order data descriptive of a plurality of requested vehicle options;
   combining the order data with manufacturing plant data, the manufacturing plant data representing production capabilities of a plurality of manufacturing plants, to generate a manufacturing plant production order;
   identifying attribute constraints within the manufacturing plant production order by determining which of the requested vehicle options are subject to the production capabilities;
   performing a calculation using a linear expression on the manufacturing plant production order and the attribute constraints, the calculation dividing the manufacturing plant production order into balanced assignments among the plurality of manufacturing plants according to the multiple attribute constraints; and
   sending at least one of the balanced assignments to at least one of the plurality of manufacturing plants.

2. The method of claim 1, wherein the attribute constraints include variants of vehicle specifications.

3. The method of claim 2, wherein the variants of vehicle specifications include combinations of features that a manufacturing plant is prepared to produce.

4. The method of claim 1, wherein the attribute constraints include constraints on production of each of the plurality of manufacturing plants.

5. The method of claim 1, wherein the attribute constraints include manufacturing capabilities of each of the plurality of manufacturing plants.

6. The method of claim 1, further comprising modifying one of the individual manufacturing plant orders before sending it to the manufacturing plant.

7. The method of claim 1, wherein the attribute constraints are weighted according to a pre-determined ranking hierarchy.

8. The method of claim 7, wherein the calculation using a linear expression includes:
   applying each of the weighted attribute constraints to the manufacturing plant production order;
   calculating a minimum production constraint for each of a plurality of manufacturing plants according to the plurality of weighted attribute constraints,
   applying a minimum production tolerance, for each of the plurality of manufacturing plants, to the manufacturing plant production order; and
   generating a set of balanced assignments that distributes the manufacturing plant production order among the plurality of manufacturing plants wherein each of the plurality of manufacturing plants is assigned an individual manufacturing plant order.

9. A method for calculating and sending balanced assignments based on dealer orders that are optimized for manufacturing plant output, comprising:
   receiving a plurality of orders for vehicles with multiple vehicle types, from a plurality of dealers;
   receiving data about production capabilities of a plurality of manufacturing plants;
   identifying attribute constraints based on the multiple vehicle types and the production capabilities;
   applying a linear expression to the plurality of orders based on the attribute constraints, thereby dividing the plurality of orders into balanced assignments among the plurality of manufacturing plants according to the multiple attribute constraints; and
   sending at least one of the balanced assignments to at least one of the manufacturing plants.

10. The method of claim 9, wherein the attribute constraints include variants of vehicle specifications.

11. The method of claim 10, wherein the variants of vehicle specifications include combinations of features that a manufacturing plant is prepared to produce.

12. The method of claim 9, wherein the attribute constraints include constraints on production of each of the plurality of manufacturing plants.

13. The method of claim 9, wherein the attribute constraints include manufacturing capabilities of each of the plurality of manufacturing plants.

14. The method of claim 9, further comprising modifying one of the balanced assignments before sending it to the manufacturing plant.

15. The method of claim 9, wherein the attribute constraints are weighted according to a pre-determined ranking hierarchy.

16. The method of claim 15, wherein the application of a linear expression includes:
   applying each of the weighted attribute constraints to the plurality of orders;
   calculating a minimum production constraint for each of a plurality of manufacturing plants according to the plurality of weighted attribute constraints;
   applying a minimum production tolerance, for each of the plurality of manufacturing plants, to the plurality of orders; and
   generating a set of balanced assignments that distributes the plurality of orders among the plurality of manufacturing plants wherein each of the plurality of manufacturing plants is assigned an individual manufacturing plant order.

17. Computer-readable storage media containing software thereon which, when loaded and executed on a computer, and in combination with execution of other software on the computer, causes the following actions to occur:
   order data descriptive of a plurality of requested vehicle options is received;
   a manufacturing plant production order is generated by combining the order data with manufacturing plant data, the manufacturing plant data representing production capabilities of a plurality of manufacturing plants;
   attribute constraints are identified within the manufacturing plant production order by determining which of the requested vehicle options are subject to the production capabilities;
   a calculation is performed using a linear expression on the manufacturing plant production order and the attribute constraints, the calculation dividing the manufacturing plant production order into balanced assignments among the plurality of manufacturing plants according to the multiple attribute constraints; and
   at least one of the balanced assignments is sent to at least one of the plurality of manufacturing plants.

18. Computer-readable storage media containing software thereon which, when loaded and executed on a computer, and in combination with execution of other software on the computer, causes the following actions to occur:

a plurality of orders for vehicles with multiple vehicle types is received from a plurality of dealers;

data about production capabilities of a plurality of manufacturing plants is received;

attribute constraints based on the multiple vehicle types and the production capabilities are identified;

a linear expression is applied to the plurality of orders based on the attribute constraints, thereby dividing the plurality of orders into balanced assignments among the plurality of manufacturing plants according to the multiple attribute constraints; and at least one of the balanced assignments is sent to at least one of the manufacturing plants.

19. Computer-readable storage media containing software thereon which, when loaded and executed on a computer, and in combination with execution of other software on the computer, causes the following actions to occur:

order data descriptive of a plurality of requested vehicles is received, the order data including specified vehicle options;

the order data is combined with manufacturing plant data, the manufacturing plant data representing vehicle production capabilities of a plurality of manufacturing plants, to generate a manufacturing plant production order;

attribute constraints are identified within the manufacturing plant production order by determining which of the specified vehicle options of the manufacturing plant production order are subject to the vehicle production capabilities of the manufacturing plants;

a calculation is performed using a linear expression on the manufacturing plant production order and the attribute constraints, the calculation dividing the manufacturing plant production order into balanced assignments among the plurality of manufacturing plants according to the multiple attribute constraints; and a production order is sent to each of the plurality of manufacturing plants based on the calculated balanced assignments.

20. The computer-readable storage media of claim 19, wherein the manufacturing plant data includes limitations on the combination of features or variations that a factory is prepared to produce.

21. The computer-readable storage media of claim 20, wherein the limitations indicate an upper production bound and a lower production bound.

22. The computer-readable storage media of claim 19, wherein the attribute constraints are weighted according to a pre-determined ranking hierarchy.

23. The computer-readable storage media of claim 22, wherein the calculation using a linear expression causes the following additional actions to occur:

each of the weighted attribute constraints is applied to the manufacturing plant production order;

a minimum production constraint is calculated for each of the plurality of manufacturing plants according to the plurality of weighted attribute constraints;

a minimum production tolerance for each of the plurality of manufacturing plants is applied to the manufacturing plant production order; and a set of balanced assignments that distributes the manufacturing plant production order among the plurality of manufacturing plants is generated, wherein each of the plurality of manufacturing plants is assigned a balanced production order.

\* \* \* \* \*